United States Patent
Martyak et al.

(10) Patent No.: US 7,201,796 B2
(45) Date of Patent: *__Apr. 10, 2007__

(54) ANTISKINNING COMPOUND AND COMPOSITIONS CONTAINING THEM

(75) Inventors: Nicholas Michael Martyak, Doylestown, PA (US); Daniel Alford, Pottstown, PA (US)

(73) Assignee: Arkema Inc., Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/190,231

(22) Filed: Jul. 27, 2005

(65) Prior Publication Data
US 2007/0022910 A1    Feb. 1, 2007

(51) Int. Cl.
  *C09D 7/04*     (2006.01)
  *C09K 15/08*   (2006.01)
  *C09K 15/18*   (2006.01)
  *C09F 9/00*    (2006.01)
  *C08K 5/32*    (2006.01)
  *C08K 5/053*   (2006.01)

(52) U.S. Cl. .................... 106/287.26; 106/287.18; 106/287.19; 106/310; 106/499

(58) Field of Classification Search ........... 106/287.18, 106/287.19, 287.23, 480, 499, 310, 19, 287, 106/287.26
See application file for complete search history.

(56) References Cited

U.S. PATENT DOCUMENTS

| | | | |
|---|---|---|---|
| 3,157,525 A * | 11/1964 | Braun | 106/287.18 |
| 4,175,064 A * | 11/1979 | Landau et al. | 525/17 |
| 4,618,371 A | 10/1986 | Weiss et al. | |
| 6,224,659 B1 | 5/2001 | Link et al. | |
| 6,730,157 B2 | 5/2004 | Steinert et al. | |
| 2003/0047112 A1 | 3/2003 | Steinert | |
| 2005/0272841 A1 * | 12/2005 | Alford et al. | 524/186 |

FOREIGN PATENT DOCUMENTS

DE    1 519 103    12/1969

* cited by examiner

*Primary Examiner*—David M. Brunsman
(74) *Attorney, Agent, or Firm*—Steven D. Boyd

(57) ABSTRACT

The invention relates to a coating material, paint or finish which contains as anti-skinning agents a combination of at least two organic and/or inorganic oxygen scavengers and also relates to compositions containing the combination, especially oxidatively drying paints or coating compositions and articles coated with such oxidatively drying paints or coating compositions.

4 Claims, No Drawings

ANTISKINNING COMPOUND AND COMPOSITIONS CONTAINING THEM

FIELD OF THE INVENTION

The invention relates to anti-skinning agents for oxidatively drying coatings. The anti-skinning agents comprise mixtures of compounds, that is combinations of additives. The invention further relates to coating compositions containing such anti-skinning agents and articles coated with them. The anti-skinning agents are combinations of organic and/or inorganic oxygen scavengers. The invention further relates to compositions containing these anti-skinning agents, like coating compositions such as oxidatively drying alkyd resins.

BACKGROUND OF THE INVENTION

Colorless and pigmented oxidatively drying paints and coatings based on oxidatively drying oils, alkyd resins, epoxy esters and other oxidatively drying refined oils are known. These oils and binders crosslink oxidatively under the influence of oxygen (preferably atmospheric oxygen) by means of the addition of driers, such as metal carboxylates of transition metals. If this crosslinking takes place before the product is actually used, a solid barrier film, a skin, can form on the surface. Skin formation can occur in open or closed containers. This is highly undesirable and should therefore be avoided since it makes the paint more difficult to work with, and commonly interferes with the uniform distribution of the driers. The accumulation of the driers in the paint skin that forms can lead to considerable delays in the drying of the paint when it is applied.

Skinning of the paint film after application is also disadvantageous. Excessively rapid drying of the surface of the paint prevents the lower film layers from drying evenly because they are shielded from oxygen, which is prevented from sufficiently penetrating into and dispersing within the paint film. This can lead among other things to flow problems in the paint film, adhesion problems, or insufficiently hard films.

It is known to add organic substances to a paint that inhibit the reaction of the drier with (atmospheric) oxygen by binding the oxygen or by complexing of the drier metal.

U.S. Pat. No. 4,618,371 describes the use of aliphatic α-hydroxy ketones as anti-skinning agents. DE-A 1 519 103 discloses N,N-dialkylated hydroxylamines for this purpose. Because of their low volatility, however, hydroxylamines alone can lead to severe delays in drying and often also to reduced film hardness values, so that their possible applications are limited. They have not been able to gain commercial acceptance as anti-skinning agents. U.S. Pat. No. 6,730,157 describes the use of organic hydroxylamines such as diethylhydroxylamine and β-dicarbonyl compounds such as diethylformamide as anti-skinning agents. US patent application publication 2003/0047112 discloses a mixture of an aliphatic amine and/or its salt with a compound of the formula specified therein, such as diethyl formamide as an anti-skinning additive for lacquer systems. U.S. Pat. No. 6,224,659 discloses the use of a combination of tin compounds as anti-skinning agents for oxidatively drying binders.

A central issue in alkyd resin technology is to quickly cure, or dry the resin which occurs via oxidative crosslinking, while maintaining adequate anti-skinning properties. Oxidatively drying coatings typically include one or more "driers" such as metals to assist in the oxidative drying reaction. Combinations of a primary drier and a secondary drier are common. Cobalt is currently the most commonly used primary drier although other metals from Groups 1A, 2A, 3A, 4A, 5A, 1B, 2B, 3B, 4B, 5B, 6B, 7B and 8B of the periodic table or combinations thereof can be employed.

Anti-skinning requires slowing the oxidative curing reaction at the air-resin interface while drying requires acceleration of the oxidative crosslinking throughout the resin film. Oximes, which act as oxygen scavengers, or suitable phenolic compounds are most often used as anti-skinning agents in industry. However, phenolic anti-skinning agents result in a significant delay in surface drying such that alone they are only suitable for certain coating compositions. Oximes such as e.g. methyl ethyl ketoxime (MEKO) or butyraldoxime, on the other hand, display only slight delays in surface drying due to their volatility. The high volatility of oximes results in rapid loss of this anti-skin agent from the alkyd in a storage can or applied film and thus does not adequately control skinning. The most significant disadvantage of the oximes, which are widely used today, lies in their toxicity. As a consequence of this, users have to observe elaborate personal protection precautions when working with paints containing oximes as anti-skinning agents.

It was discovered that the use of the combination of two or more oxygen scavengers as described below provides for inhibition of skinning with minimal impact on drying properties. In particular, the above-mentioned disadvantages of the specified hydroxylamines as anti-skinning agents could also be avoided by combining two or more oxygen scavengers, and hence products that better satisfy requirements as anti-skinning agents are obtained.

Incorporating a combination of two or more oxygen scavengers according to the present invention into an air-drying coating such as an alkyd resin coating provides an alkyd resin system which is resistant to undesirable skinning and exhibits improved drying of the resin films after application.

DETAILED DESCRIPTION OF THE INVENTION

The present invention relates to an anti-skinning agent containing two or more oxygen scavengers. The two or more oxygen scavenges can be, independently, organic or inorganic. It was found that such a combination provides effective anti-skinning control at lower total oxygen scavenger concentration. This reduced oxygen scavenger concentration allows for acceptable dry through without the need for a drier activator. This allows a combination of two or more oxygen scavengers to provide for effective control of both the skinning and dry through processes. The control of skinning, that is the drying at the air-resin interface and the control of dry through or the drying of the entire resin coating are both of concern in resin coating formulation. It was discovered that proper selection of multiple oxygen scavengers can provide for control of both properties while limiting the materials added to the resin base.

An organic or inorganic oxygen scavenger is a material which exhibits the ability to complex with free oxygen and slow its oxidative reactions. Representative examples of organic oxygen scavengers include but are not limited to: hydroquinones, substituted hydroquinones, semi-hydroquinones, catechol, substituted catechols, erythorbic acid, ascorbic acid, hydroxylamine compounds, carbohydrazides and methyl ethyl ketoxime. Representative examples of inorganic oxygen scavengers include but are not limited to hydrazine and sulfites. The present invention is directed to combinations of two or more oxygen scavengers selected such that skinning is controlled at a sufficiently low oxygen scavenger dosage that dry through is acceptable without the need for a drier activator. A representative example of such a combination is a combination of a hydroxylamine and a hydroquinone.

Hydroxylamine oxygen scavengers in accordance with the present invention are of the general formula:

where $R^1$ and $R^2$ mutually independently hydrogen, a linear or branched, saturated or unsaturated $C_1$–$C_{20}$ aliphatic molecule or radical, which can optionally be mono- or polysubstituted, or a $C_6$–$C_{12}$ aryl molecule or radical, a $C_7$–$C_{14}$ araliphatic molecule or radical or a $C_5$–$C_7$ cycloaliphatic.

Representative hydroxylamine compounds include but are not limited to: hydroxylamine, methylhydroxylamine, dimethylhydroxylamine, methylethylhydroxylamine, ethylhydroxylamine, diethylhydroxylamine, dibutylhydroxylamine, dibenzylhydroxylamine, mono-isopropylhydroxylamine and mixtures thereof. A preferred hydroxylamine is diethylhydroxylamine (DEHA).

Hydroquinone oxygen scavengers in accordance with the present invention may be unsubstituted or substituted. The substituted hydroquinone oxygen scavengers can be substituted in the ortho or meta positions or both with moieties including but not limited to C-1 to C-6 alkyl or aryl moieties. Representative examples of substituted hydroquinones include but are not limited to methyl hydroquinone.

The invention also relates to compositions of matter such as coating materials, paints or finishes containing such a combination of anti-skinning agents.

For the purposes of the invention, mixtures of two or more organic and/or inorganic oxygen scavengers are used alone or as solutions, dispersions or emulsions in water and/or organic solvents. Suitable organic solvents include all conventional solvents, such as aromatics, white spirits, ketones, alcohols, ethers and fatty acid esters. The present invention provides for a novel means of balancing the need for a rapid dry through of a resin coating, such as an alkyl resin coating, while maintaining an acceptable oxidative control at the air-resin interface to control skinning.

For use according to the present invention the two or more organic and/or inorganic oxygen scavengers can be used in a broad range of mixtures with one another. They are preferably used in the ratio of the first oxygen scavenger (A) to the second oxygen scavenger (B) of (A):(B) from 0.01:75 to 75:0.01, preferably from 0.05:30 to 30:0.05 and most preferably from 0.1:10 to 10:0.1 parts. They can be used in pure form or in aqueous solution or aqueous dispersion or emulsion or in the form of solutions in organic solvents. Aqueous in this context is intended to mean that water is either the sole solvent or is added in a quantity of over 50 wt. % relative to the solvent blend together with conventional organic solvents (e.g. alcohols).

The amount of anti-skinning agent combination used in a coating system primarily depends on the content of binder and drier used in the particular coating composition. As a general rule between about 0.001 and 2.0 wt. % of mixtures of oxygen scavenger combination according to the present invention should be added. Preferred amounts to be used are about 0.01 to 0.5 wt. %, relative in each case to the overall composition of the coating composition. The amounts can also depend on the type of binder and the pigments used in the coating composition. Thus, in special systems the relative amount of additive to be used can also be greater than about 2.0 wt. % (relative to the overall composition).

It is an advantage of the anti-skinning agent combination of the present invention that it reliably prevents skinning in a wide range of binders and when used with various driers but that it does not unfavorably influence other drying properties of the resin such as dry through.

Oxygen scavenges alone, such as DEHA, are sufficient to inhibit or slow the propensity for skinning at the air-alkyd interface. However, DEHAs relativity low volatility causes delayed dry-through performance. For example, the addition of 500 ppm DEHA to an alkyd is sufficient to slow skinning but it may take hours to days for the alkyd layer to completely dry.

It is also desirable to have a simple anti-skin additive(s) package. The present inventors have found that it is possible to lower the concentration of the primary anti-skinning additive but make it more active by adding an additional additive that acts in a synergistic fashion with the primary anti-skinning additive. The lower concentration of the primary anti-skin additive allows for rapid dry-through without the need for additives such as alkylamines or alkyl alkanolamines.

The invention is further illustrated but is not intended to be limited by the following examples in which all parts and percentages are by weight unless otherwise specified.

EXAMPLES

Example 1

The oxygen scavenging capabilities of a first oxygen scavenger diethylhydroxylamine (DEHA) with a second oxygen scavenger hydroquinone (HQ) each alone and in combination was evaluated. Aqueous solutions were prepared containing DEHA and hydroquinone each at $1\times10^{-3}$ M alone [89 ppm DEHA; 110 ppm HQ] and then a mixture containing 6:1 DEHA:HQ at a total concentration of the mixture of $1\times10^{-3}$ M. The solutions were adjusted to pH 9.0 and the removal of oxygen from the aqueous solution was monitored using an $O_2$-sensitive electrode. The results showed DEHA is effective in scavenging dissolved oxygen (DO), HQ is slightly more effective than DEHA. The combination of the two oxygen scavengers is more effective than either alone. Table 1 summarizes the results.

TABLE 1

| DEHA (pH 9) | | HQ (pH 9) | | DEHA:HQ 6:1 (pH 9) | |
| --- | --- | --- | --- | --- | --- |
| Time (min) | $O_2$ (ppm) | Time (min) | $O_2$ (ppm) | Time (min) | $O_2$ (ppm) |
| 1 | 8.69 | 1 | 5.50 | 1 | 3.53 |
| 2 | 8.22 | 2 | 3.82 | 2 | 1.68 |
| 3 | 7.94 | 3 | 2.80 | 3 | 0.85 |
| 4 | 7.75 | 4 | 2.25 | 4 | 0.49 |
| 5 | 7.61 | 5 | 1.70 | 5 | 0.33 |
| 6 | 7.48 | 6 | 1.44 | 6 | 0.25 |
| 7 | 7.36 | 7 | 1.19 | 7 | 0.23 |
| 8 | 7.26 | 8 | 1.05 | 8 | 0.21 |

TABLE 1-continued

| DEHA (pH 9) | | HQ (pH 9) | | DEHA:HQ 6:1 (pH 9) | |
|---|---|---|---|---|---|
| Time (min) | $O_2$ (ppm) | Time (min) | $O_2$ (ppm) | Time (min) | $O_2$ (ppm) |
| 9  | 7.15 | 9  | 0.95 | 9  | 0.20 |
| 10 | 7.06 | 10 | 0.87 | 10 | 0.21 |
| 15 | 6.64 | 15 | 0.74 | 15 | 0.21 |
| 20 | 6.30 | 20 | 0.74 | 20 | 0.22 |
| 25 | 6.01 | 25 | 0.75 | 25 | 0.23 |
| 30 | 5.76 | 30 | 0.78 | 30 | 0.24 |
| 60 | 4.85 | 60 | 1.07 | 60 | 0.24 |
| 90 | 4.46 | 90 | 1.64 | 90 | 0.29 |

Example 2

Tung oil was used as the curing medium in this example. When cobaltous, Co(II), is added to tung oil it quickly causes curing (loss of cis unsaturation in the oil) producing a hard film. Addition of an anti-skin agent(s) to such a combination slows the curing of tung oil. Samples were prepared as follows and placed in bottles. Air was flowed over the top of the bottles and the samples were observed and the onset of surface skin formation monitored.

Curing of Tung Oil Only: to a 100 gram sample of tung oil was added 0.1% by weight of Co(II) (Co 12 available from OMG America, Westlake, Ohio). The cobalt was mixed into the tung oil.

Concentrated anti-skin agent(s) solutions as described below were prepared in water then added to tung oil/cobalt samples prepared as described above. No co-promoters such as amines were added.

Sample A. No Antiskin Agent: A 10 gram sample of tung oil-Co(II) was placed in a glass bottle. The bottle is placed in an exhaust hood with air flowing over the top of the glass bottle at the rate of approximately 100 ft$^3$/minute.

Sample B. DEHA Alone: A 10 gram sample of tung oil-Co(II) was placed in a glass bottle and $2.2 \times 10^{-3}$ M DEHA (about 200 ppm) was added. The solution was mixed and the bottle placed in an exhaust hood with air flowing over the top of the glass bottle at the rate of approximately 100 ft$^3$/minute.

Sample C. HQ Alone: A 10 gram sample of tung oil-Co(II) was placed in a glass bottle and $2.2 \times 10^{-3}$ M HQ (about 247 ppm) was added. The solution was mixed and the bottle placed in an exhaust hood with air flowing over the top of the glass bottle at the rate of approximately 100 ft$^3$/minute.

Sample D. DEHA:HQ [6:1]: A 10 gram sample of tung oil-Co(II) was placed in a glass bottle and $2.2 \times 10^{-3}$ M of the mixture [about 152 ppm DEHA plus 32 ppm HQ] was added. The solution was mixed and the bottle placed in an exhaust hood with air flowing over the top of the glass bottle at the rate of approximately 100 ft$^3$/minute. Table 2 summarizes the results.

TABLE 2

| Solution/Days | Sample A | Sample B | Sample C | Sample D |
|---|---|---|---|---|
| 0  | No Skinning | No Skinning | No Skinning | No Skinning |
| 1  | Skinning | No Skinning | No Skinning | No Skinning |
| 2  | Skinning | No Skinning | No Skinning | No Skinning |
| 3  | Skinning | No Skinning | No Skinning | No Skinning |
| 4  | Skinning | No Skinning | No Skinning | No Skinning |
| 5  | Skinning | No Skinning | No Skinning | No Skinning |
| 6  | Skinning | Starting to Skin | Starting to Skin | No Skinning |
| 7  | Skinning | Skin | Skinning | No Skinning |
| 8  | Skinning | Skin | Skinning | No Skinning |
| 9  | Skinning | Skinning | Skinning | No Skinning |
| 10 | Skinning | Skinning | Skinning | Starting to Skin |
| 11 | Skinning | Skinning | Skinning | Skinning |

The data shows that the combination of the two oxygen scavengers acted in concert to slow skinning more efficiently than either oxygen scavenger alone.

The preferred method of the invention is to use a two oxygen scavenger combination as an anti-skinning package, one component comprising the principal anti-skin agent and the other component acting to "activate" the principal component. It is believed that non-oxygen scavengers such as conventional driers could also function to activate the combination of the present invention. Conventional driers include metals such as cobalt or metals selected from Groups 1A, 2A, 3A, 4A, 5A, 1B, 2B, 3B, 4B, 5B, 6B, 7B and 8B or combinations thereof.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A coating material, paint or finish which contains an oxidatively drying film former and an anti-skinning agent comprising a synergistic combination of a hydroxylamine and a hydroquinone.

2. The coating material, paint or finish of claim 1, wherein said hydroxylamine is diethylhydroxylamine.

3. A process for the production of a coating material, paint or finish containing an oxidatively drying film former comprising incorporating into the coating material, paint or finish, an anti-skinning combination comprising a synergistic combination of a hydroxylamine and a hydroquinone.

4. The process of claim 3, wherein said hydroxylamine is diethylhydroxylamine.

* * * * *